(No Model.)

P. F. GUTHRIE.
PUMPING APPARATUS.

No. 343,765. Patented June 15, 1886.

WITNESSES:

INVENTOR:
P. F. Guthrie

BY Munn & Co
ATTORNEYS.

UNITED STATES PATENT OFFICE.

PATRICK F. GUTHRIE, OF FRANKLIN, NEW JERSEY.

PUMPING APPARATUS.

SPECIFICATION forming part of Letters Patent No. 343,765, dated June 15, 1886.

Application filed March 18, 1886. Serial No. 195,662. (No model.)

*To all whom it may concern:*

Be it known that I, PATRICK F. GUTHRIE, of Franklin, in the county of Essex and State of New Jersey, have invented a new and useful Improvement in Pumping Apparatus, of which the following is a full, clear, and exact description.

Reference is to be had to the accompanying drawings, forming a part of this specification, in which similar letters of reference indicate corresponding parts in both the figures.

Figure 1:
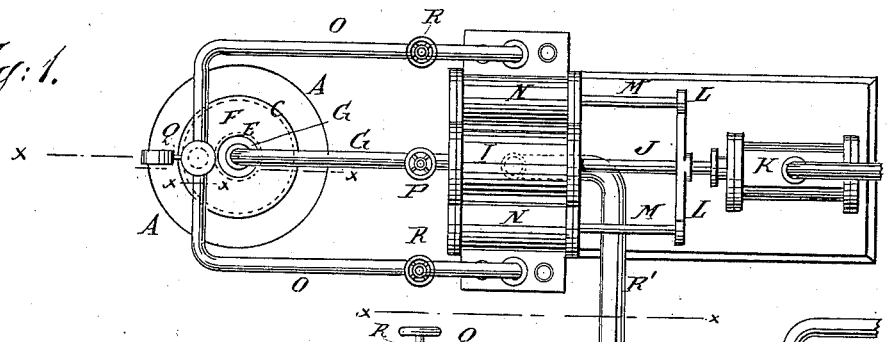
Figure 2:
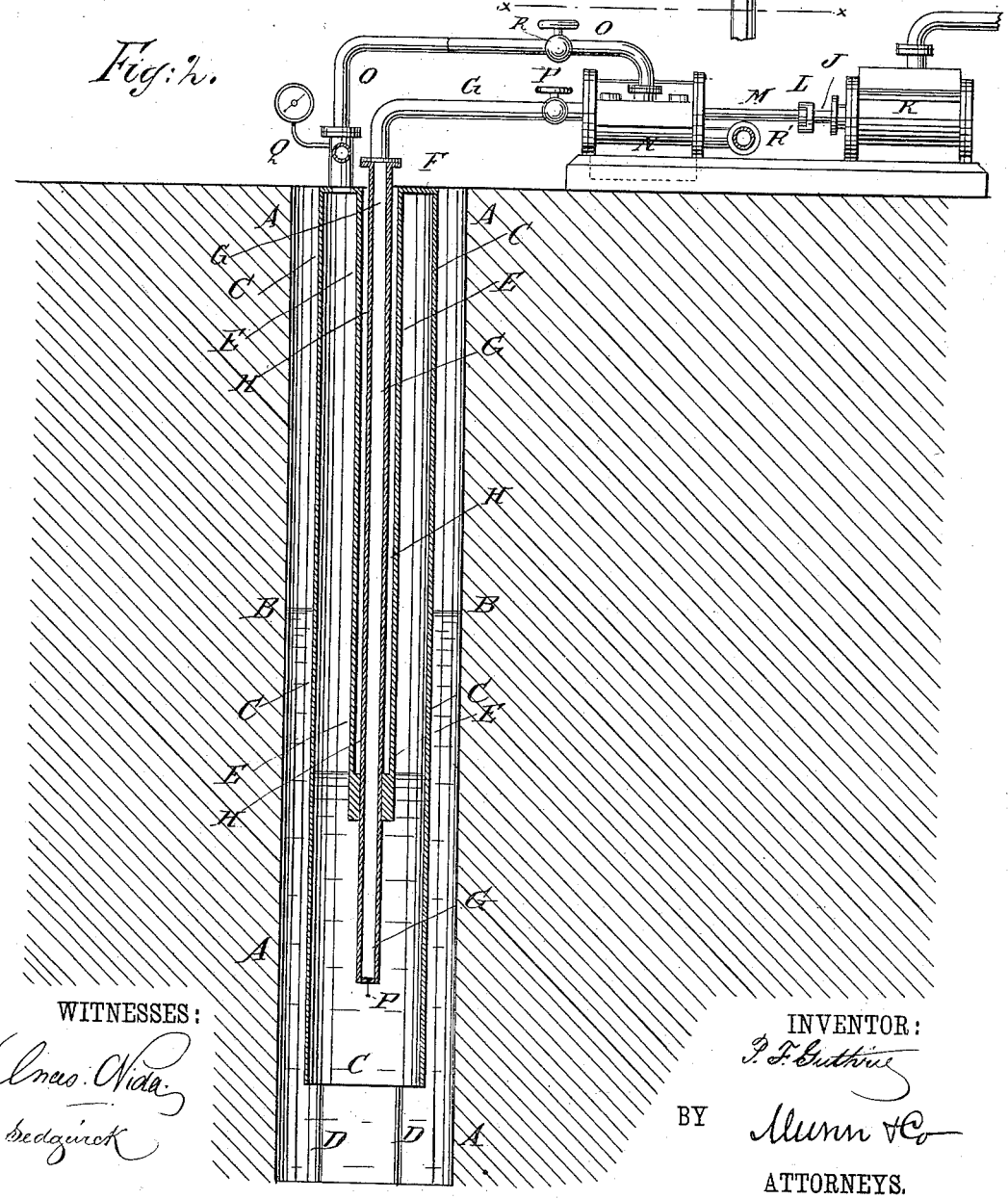

Figure 1 is a plan view of my improved pumping apparatus. Fig. 2 is a sectional side elevation of the same, taken through the broken line *xx xx xx*, Fig. 1.

The object of this invention is to provide pumping apparatus constructed in such a manner that a liquid can be raised more easily and to a greater height than when the ordinary construction is used.

The invention consists in the construction and combination of various parts of the pumping apparatus, as will be hereinafter fully described.

A represents a well, cistern, river, or other liquid-reservoir, and B represents the point of ordinary water-level.

C represents a pipe let down into the reservoir A, and supported by legs D or other suitable means, with its open lower end at a suitable distance below the surface B of the liquid.

In the middle part of the pipe C is placed a pipe, E, the upper end of which is connected air-tight with the upper end of the said pipe C by an annular plate, F. The lower end of the pipe E extends below the water-level B, but need not extend to the lower end of the pipe C.

Within the pipe E is placed a pipe, G, of a less diameter than the said pipe E, and with which the lower end of the said pipe E is connected air and water tight. The upper end of the space H between the pipes E G is open, so that the said space will form an air-chamber to prevent the pipe G from being crushed by the pressure of the compressed air in the pipe C when a vacuum is formed in the said pipe G, as would be liable to happen were the pipe E omitted and the cover F connected air-tight with the pipe G. The upper end of the pipe G is connected with the end of the pump-cylinder I, the piston of which is connected with and operated by the piston-rod J of the steam-cylinder K.

To the piston-rod J is attached the center of a cross-bar, L, to the ends of which are attached the ends of the piston-rods M of the two cylinders N, placed at the opposite sides of the pump-cylinder I, so that the suction-pump I and the two air force-pumps N will be operated from the piston-rod J, and the said piston-rod J will be relieved from any side strain.

With the air-chambers of the air-pumps N are connected the ends of the branches of a pipe, O, the other end of which is connected air-tight with the cover F.

The pipe G is provided with stop and check valves P at its upper and lower ends, respectively, to prevent the back-flow of water into or from the said pipe. The pipe O or the cover F is provided with a safety-valve, Q, which can be adjusted to resist any desired pressure. The pipe O is provided with valves R at the upper ends of its branches, to prevent back-pressure of air upon the air-pumps. With this construction, when the engine K is operated, the liquid will be drawn by the pump I through the pipe G and discharged through the pipe R', and air will be forced by the pumps N through the pipe O into the pipe C, and compressed therein, so as to apply the pressure of compressed air to the surface of the liquid in the said pipe C, and thus assist in forcing the liquid into the suction-pipe G. With this construction, also, water or other liquid can be raised with greater ease and to a greater height than is possible with a pumping apparatus constructed in the ordinary manner.

Having thus fully described my invention, I claim as new and desire to secure by Letters Patent—

1. In a pumping apparatus, the combination, with the engine K, the suction-pump I, and the air force-pumps N, of the interior suction-pipe, G, and the exterior compressed-air pipe, C, having air-tight cover F, through which the suction-pipe G passes, connected with the air force-pumps N by the branched pipe O, and provided with a safety-valve, Q, substantially as herein shown and described, whereby the natural pressure of the atmosphere is supplemented by the pressure of compressed air forcing the liquid through the suction-pipe of a pump, as set forth.

2. In a pumping apparatus, the combination, with the engine K, the suction-pump I, the air force-pumps N, the suction-pipe G of the suction-pump, and the exterior compressed-air pipe, C, having air-tight cover F, through which the suction-pipe G passes, connected with the air force-pumps N by the branched pipe O, and provided with a safety-valve, Q, of the intermediate pipe, E, connected air-tight at its upper end with the cover F and at its lower end with the suction-pipe G, substantially as herein shown and described, whereby an air chamber will be formed around the suction-pipe to prevent the said suction-pipe from being crushed by the pressure of the compressed air, as set forth.

3. The combination, with a pumping-engine provided with a water and air cylinder, substantially as described, of a tube closed at its upper and open at its lower end, and inclosing the suction-pipe of the pump, and a pipe connecting the space between said suction-pipe and the inclosing-tube with the air-cylinder of the pump, as and for the purpose set forth.

PATRICK F. GUTHRIE.

Witnesses:
JAMES T. GRAHAM,
C. SEDGWICK.